United States Patent [19]
Freshour et al.

[11] 3,724,762
[45] Apr. 3, 1973

[54] FLUID DISCHARGE SYSTEM

[76] Inventors: Kenneth D. Freshour, 2908 Pelham; John C. Van Dyk, 824 N.W. 15th St., both of Oklahoma City, Okla.

[22] Filed: Feb. 8, 1971

[21] Appl. No.: 113,608

Related U.S. Application Data

[63] Continuation of Ser. No. 814,716, April 9, 1969, abandoned.

[52] U.S. Cl. ..........239/427.3, 239/419.5, 239/428.5
[51] Int. Cl. ...............................................B05b 7/00
[58] Field of Search.....239/428.5, 419.5, 427, 427.3, 239/427.5

[56] References Cited

UNITED STATES PATENTS

| | | | |
|---|---|---|---|
| 1,941,726 | 1/1934 | Vawter | 239/428.5 |
| 366,169 | 7/1887 | Hyatt | 239/428.5 |
| 992,181 | 5/1911 | Foss | 239/427.3 |

FOREIGN PATENTS OR APPLICATIONS

| | | | |
|---|---|---|---|
| 468,687 | 7/1937 | Great Britain | 239/428.5 |
| 5,188 | 1/1897 | Norway | 239/427.3 |

*Primary Examiner*—M. Henson Wood, Jr.
*Assistant Examiner*—John J. Love
*Attorney*—Richards, Harris & Hubbard

[57] ABSTRACT

A fluid discharge system for use both as a nozzle and as a fluid oxidizer. The system includes a plurality of identical cup-shaped converging members positioned at equally spaced points. A stream of water is directed through all of the converging members and is discharged from the last member. Each converging member acts as a venturi to add air to the water. The air both oxidizes impurities in the water and increases the discharge distance of the stream.

4 Claims, 2 Drawing Figures

PATENTED APR 3 1973 3,724,762

INVENTOR:
KENNETH D. FRESHOUR
JOHN C. van DYK

Richards, Harris & Hubbard
ATTORNEYS

FLUID DISCHARGE SYSTEM

This application is a continuation of Applicant's copending application, Ser. No. 814,716, filed Apr. 9, 1969, now abandoned.

BACKGROUND OF THE INVENTION

The object of many fluid discharge systems, such as fire hose nozzles, garden sprayers and the like, is to increase the discharge distance of the fluid. Other systems promote oxidation or other chemical reactions involving the fluid by causing turbulence and dispersion of the fluid. In the past, all such systems have basically been comprised of a single convergent section located at the point of discharge of the fluid. Convergent sections tend to increase the discharge velocity of fluids which in turn increases discharge distance. Convergent sections also tend to increase the discharge turbulence of fluids which in turn causes the fluid to tend to disperse.

In accordance with the present invention, a fluid is directed through a plurality of convergent sections each open to the atmosphere. Each convergent section acts as a venturi to draw air into the fluid. This promotes oxidation of the fluid. The addition of the air to the fluid also increases the discharge distance of the fluid.

SUMMARY OF INVENTION CLAIMED

In the preferred embodiment, this invention comprises a plurality of fluid adding members positioned at spaced points along a fluid stream. Preferably, the adding members are cup-shaped venturi forming members positioned at intervals adjacent the point of discharge of the fluid.

BRIEF DESCRIPTION OF THE DRAWINGS

A more complete understanding of the invention may be had by referring to the following detailed description when taken in conjunction with the drawings, wherein.

DETAILED DESCRIPTION

Figure 2:
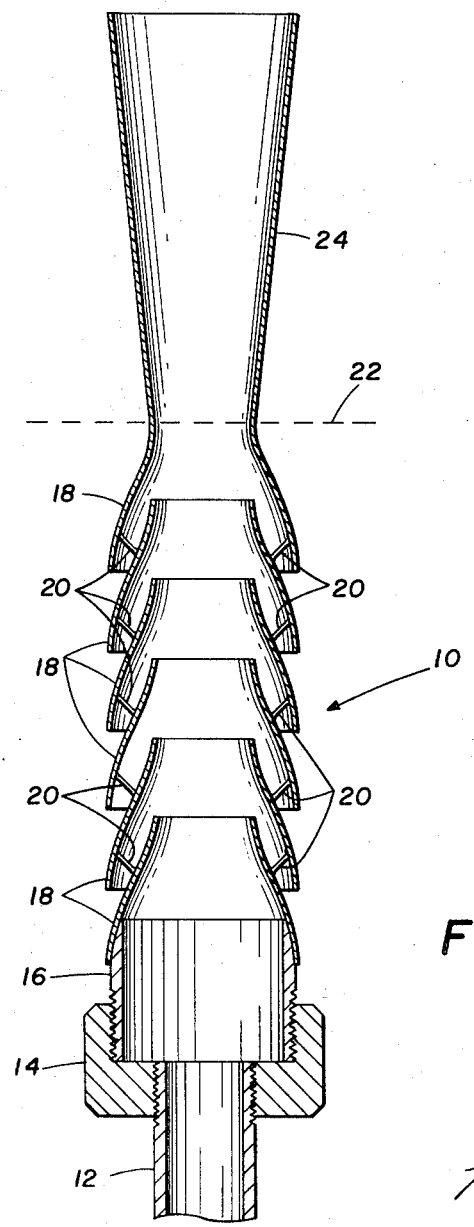
FIG. 2 is an enlarged sectional view of a portion of the device shown in FIG. 1.

Referring now to the drawings, and particularly to FIG. 2, there is shown a fluid discharge system 10 employing the invention. The system 10 is mounted on a pipe 12 which extends from a source of fluid under pressure (not shown) such as an ordinary water pump. The system 10 is secured to the pipe 12 by a reducing coupling 14 and comprises a large diameter end member 16 and a plurality of identical cup-shaped converging sections 18. The first cup-shaped section 18 is secured directly to the large diameter member 16. The remainder of the cup-shaped sections 18 are secured in spaced relation to each other by a plurality of pins 20. The pins 20 extend from the small end of each cup-shaped section 18 to the large end of the next adjacent section 18 and are randomly spaced so that the interior of the fluid discharge system 10 is open to the atmosphere.

The fluid discharge system 10 may be used both as a nozzle and as a fluid oxidizer. When the system 10 is used as a nozzle, the cup-shaped section 18 remote from the member 16 has the same shape as the other cup-shaped members 18. That is, the endmost cup-shaped section 18 is terminated at a point indicated by the dash line 22 in FIG. 2. When water or any other fluid is forced through such a nozzle, each cup-shaped section 18 after the section 18 that is attached to the member 16 acts as a venturi. Because the interior of the system 10 is open to the atmosphere, the venturi effect of the sections 18 adds air to the moving fluid stream. The addition of air to the stream as it is discharged greatly increases the discharge distance of the stream.

By way of example, a nozzle of the type shown in FIG. 2 was constructed from identical cup-shaped converging sections each having a total length of 32 millimeters, a large diameter opening of 40 millimeters and a small diameter opening of 20 millimeters. The nozzle was assembled with the end of each section separated from the same end of the next adjacent section by 17 millimeters. When water pressurized to 40 pounds per square inch was supplied to the nozzle, the following results were obtained:

|  | Discharge Distance |
| --- | --- |
| pipe alone | 20' |
| one cup, no venturi | 30' |
| 1 stage venturi | 35' |
| 3 stage | 50' |
| 6 stage | 50–60' |
| 9 stage | 40' |

The addition of the large diameter member 16 and the first cup-shaped section 18 to the basic pipe is equivalent to adding a conventional nozzle. This is because the first cup-shaped section 18 is a simple converging section and has no venturi effect. The result of adding a plurality of venturi sections to a basic nozzle is demonstrated by the increase in discharge distance resulting from the use of three and six venturi stages. The use of six venturi stages substantially triples the discharge distance from a basic pipe and doubles the discharge distance from a simple converging section.

Figure 1:
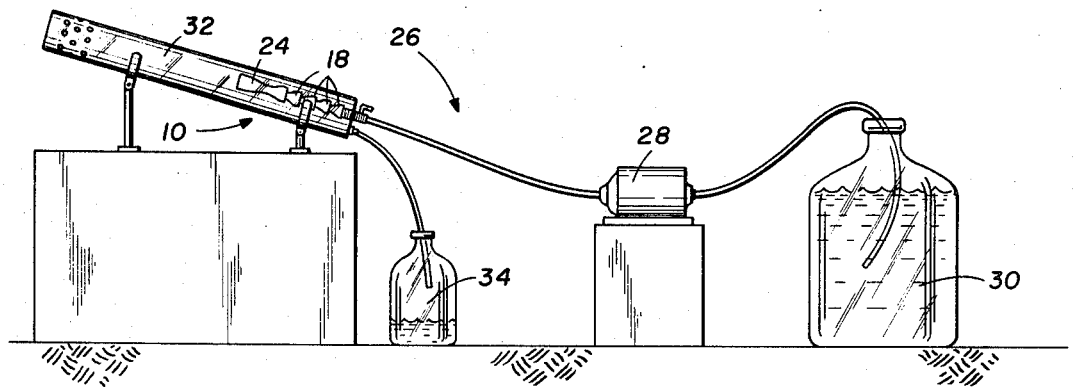
FIG. 1 is a front view of a fluid oxidizing system employing the invention.

When the system 10 is used as a fluid oxidizer, a divergent section 24 is added to the end of the endmost cup-shaped section 18 in the manner shown in FIG. 2. A fluid oxidizing system 26 employing a fluid discharge system 10 so constructed is shown in FIG. 1. The fluid oxidizing system 26 includes a pump 28 which forces fluid from a fluid supply tank 30 through a fluid discharge system positioned within a casing 32. Fluid discharged from the fluid discharge system 10 collects on the walls of the casing 32 and drains into a collection tank 34.

The performance of the system 26 as a fluid oxidizer was tested using water obtained from Sulphur, Okla. Before oxidation, such water was found to contain 63 parts per million sulphur. After the water was oxidized by the system 26, the water was found to contain 14.3 parts per million sulphur. Thus, use of the oxidizing system 26 resulted in a reduction of the sulphur content of the water by approximately 78 percent.

Of course, the fluid discharge system according to the present invention is not limited to use as a nozzle or as a fluid oxidizer but may be used in any desired manner. Also, the system is not limited to devices having the sizes described but may be of any desired size and may be formed from any desired material. Thus, although only one embodiment and only two uses of the invention are shown in the drawings and described in the foregoing specification, it will be understood that the invention is not limited to the embodiment and uses described, but is capable of rearrangement, modification and substitution of parts and elements without departing from the spirit of the invention.

What is claimed is:

1. Apparatus for maximizing the discharge distance of a liquid comprising:

means for directing a liquid under pressure as a stream of predetermined cross-section along a predetermined path, and a plurality of convergent members positioned in sequence along the path, each being open to a gaseous environment to entrain gas in the stream and thereby increase the volume of the fluid in the stream, the convergent ends of the members being approximately equal in size to the cross-section of the liquid stream to increase the velocity of the stream, the last convergent member being positioned to discharge the stream into the gaseous environment without further significant interference by the apparatus, whereby the increased velocity resulting from the increased total fluid volume passing through the successive convergent members will maximize the discharge distance of the liquid.

2. The discharge distance maximizing apparatus according to claim 1 wherein the convergent members form venturis which entrain gas from the gaseous environment into the liquid, and wherein the last convergent member sprays the liquid and the gas entrained therein into the gaseous environment.

3. The discharge distance maximizing apparatus according to claim 1 further including means for securing the convergent members to the receiving means and to one another, and thereby joining the convergent members and the receiving means into a liquid discharge nozzle.

4. The discharge distance maximizing apparatus according to claim 1 wherein the convergent members are identical cup-shaped sections supported by pins extending between each convergent member and the next adjacent convergent member, and wherein each cup-shaped section comprises a large diameter end and a small diameter end located downstream from the large diameter end and within the large diameter end of the next adjacent cup-shaped section.

* * * * *